(12) United States Patent
Kan et al.

(10) Patent No.: US 7,055,843 B2
(45) Date of Patent: Jun. 6, 2006

(54) VEHICLE BODY-PROTECTING DEVICE FOR TWO-WHEELED MOTOR VEHICLE

(75) Inventors: Makoto Kan, Niiza (JP); Hideo Ochiai, Niiza (JP); Yoshinori Mifune, Niiza (JP)

(73) Assignee: Honda Access Corporation, Niiza (JP)

( * ) Notice: Subject to any disclaimer, the term of this patent is extended or adjusted under 35 U.S.C. 154(b) by 0 days.

(21) Appl. No.: 10/479,029

(22) PCT Filed: Feb. 21, 2002

(86) PCT No.: PCT/JP02/01570

§ 371 (c)(1),
(2), (4) Date: Jul. 28, 2004

(87) PCT Pub. No.: WO02/098721

PCT Pub. Date: Dec. 12, 2002

(65) Prior Publication Data

US 2004/0251657 A1    Dec. 16, 2004

(30) Foreign Application Priority Data

May 31, 2001    (JP) ............................. 2001-165126

(51) Int. Cl.
*B62J 27/00*    (2006.01)
(52) U.S. Cl. .................... 280/304.3; 280/291; 280/293
(58) Field of Classification Search ............. 280/288.4, 280/304.3, 291, 293, 298, 755, 848; 293/105, 293/142; 180/232; D12/167
See application file for complete search history.

(56) References Cited

U.S. PATENT DOCUMENTS

| 1,941,801 | A | * | 1/1934 | Harley | 293/105 |
|---|---|---|---|---|---|
| 2,126,752 | A | * | 8/1938 | Devine et al. | 280/304.3 |
| 3,075,789 | A | * | 1/1963 | Hott | 280/295 |
| 3,602,528 | A | * | 8/1971 | Kelly | 280/293 |
| 4,085,956 | A | * | 4/1978 | Weisshappel et al. | 293/136 |
| 4,203,500 | A | * | 5/1980 | Kamiya | 280/293 |
| 4,826,194 | A | * | 5/1989 | Sakita | 285/302 |
| 5,029,894 | A | * | 7/1991 | Willman | 280/293 |
| 5,106,136 | A | * | 4/1992 | Crain | 280/304.3 |
| 5,524,918 | A | * | 6/1996 | Peabody et al. | 280/291 |
| 5,709,583 | A | * | 1/1998 | Suto et al. | 446/440 |

(Continued)

FOREIGN PATENT DOCUMENTS

JP        20300/1976    8/1977

(Continued)

*Primary Examiner*—Lesley D. Morris
*Assistant Examiner*—Daniel Yeagley
(74) *Attorney, Agent, or Firm*—Carrier, Blackman & Associates, P.C.; Joseph P. Carrier; William D. Blackman

(57) ABSTRACT

In a vehicle body-protecting device for a two-wheeled motor vehicle, in which a pair of left and right guard members are mounted to a vehicle body frame assembly to overhang laterally outwards, so that when the two-wheeled motor vehicle is turned sideways, said guard members are allowed to be grounded, whereby the grounding of an outer surface of a vehicle body is diminished, each of the guard members is formed by connecting a ground element which is grounded upon the turning-sideways of the two-wheeled motor vehicle to a mounting base secured to the vehicle body frame assembly through an elastic element for swinging movement. Thus, it is possible to eliminate the need for the special strengthening of the vehicle body frame assembly in such a manner that a shock due to the turning-sideways of the two-wheeled motor vehicle can be received on the vehicle body frame assembly, while being buffered.

8 Claims, 5 Drawing Sheets

U.S. PATENT DOCUMENTS

| | | | |
|---|---|---|---|
| 6,213,237 B1 * | 4/2001 | Willman | 180/209 |
| 6,241,639 B1 * | 6/2001 | Hervig | 482/57 |
| 6,485,044 B1 * | 11/2002 | Blake | 280/288.4 |
| 6,637,787 B1 * | 10/2003 | Salvisberg | 293/105 |
| 2005/0212254 A1 * | 9/2005 | Heitner | 280/298 |

FOREIGN PATENT DOCUMENTS

| | | |
|---|---|---|
| JP | 60-189682 A | 9/1985 |
| JP | 185453/1987 | 6/1989 |
| JP | 9-58550 A | 3/1997 |

* cited by examiner

VEHICLE BODY-PROTECTING DEVICE FOR TWO-WHEELED MOTOR VEHICLE

FIELD OF THE INVENTION

The present invention relates to an improvement in a vehicle body-protecting device for a two-wheeled motor vehicle, in which a pair of left and right guard members are mounted to a vehicle body frame assembly to overhang laterally outwards, so that when the two-wheeled motor vehicle is turned sideways, the guard members are allowed to be grounded, whereby the damage to an outer surface of a vehicle body due to the grounding is diminished.

BACKGROUND ART

In such a conventional vehicle body-protecting device for a two-wheeled motor vehicle, the guard member is formed of a rigid material, so that a shock force produced due to the turning-sideways of the two-wheeled motor vehicle is received directly on the vehicle body frame assembly, whereby the damage to the outer surface of the vehicle body due to the grounding is suppressed to the minimum.

In such conventional device, the vehicle body frame assembly must be strengthened to equal to or more than a strength required for traveling of the two-wheeled motor vehicle, and the weight of the two-wheeled motor vehicle is obliged to be increased.

DISCLOSURE OF THE INVENTION

The present invention is accomplished with such circumstances in view, and it is an object of the present invention to provide a vehicle body-protecting device for a two-wheeled motor vehicle, wherein a shock force produced due to the turning-sideways of the two-wheeled motor vehicle can be received on a vehicle body frame assembly, while being buffered, whereby the special strengthening of the vehicle body frame assembly is not required.

To achieve the above object, according to a first aspect and feature of the present invention, there is provided a vehicle body-protecting device for a two-wheeled motor vehicle, in which a pair of left and right guard members are mounted to a vehicle body frame assembly to overhang laterally outwards, so that when the two-wheeled motor vehicle is turned sideways, the guard members are allowed to be grounded, whereby the grounding of an outer surface of a vehicle body is diminished, characterized in that each of the guard members is formed by connecting a ground element which is grounded upon the turning-sideways of the two-wheeled motor vehicle to a mounting base secured to the vehicle body frame assembly through an elastic element for swinging movement.

With the first feature, when the ground element of the guard member collides with a road surface upon the turning-sideways of the two-wheeled motor vehicle, the ground element deforms the elastic element, while being swung relative to the mounting base, thereby buffering a shock force due to the turning-sideways of the two-wheeled motor vehicle. Thus, it is possible to avoid that an excessive shock force is applied to the vehicle body frame assembly which supports the guard member. Therefore, it is unnecessary to specially strengthen the vehicle body frame assembly, and it is possible to provide a reduction in weight of the vehicle body frame assembly.

According to a second aspect and feature of the present invention, in addition to the first feature, the ground element is connected to the mounting base for movement along an axis substantially parallel to an axis of a rear wheel of the two-wheeled motor vehicle, so that the elastic element is deformed even when the ground element is moved toward the mounting base.

With the second feature, when the two-wheeled motor vehicle is turned sideways, the ground element can deform the elastic element, while being moved axially even toward the mounting base, thereby effectively buffering the shock force due to the turning-sideways of the two-wheeled motor vehicle.

According to a third aspect and feature of the present invention, in addition to the second feature, a pivot including a support shaft substantially parallel to an axis of the rear wheel of the two-wheeled motor vehicle is fitted into a pivot bore which is provided in the mounting base and extends in a longitudinal direction of the two-wheeled motor vehicle; the ground element is axially movably mounted to the support shaft; and the elastic element is interposed among the mounting base, the ground element and the support shaft.

With the third feature, when the two-wheeled motor vehicle is turned sideways, the elastic element can be deformed by the swinging movement of the support shaft and the axial movement of the ground element on the support shaft, thereby effectively buffering the shock force due to the turning-sideways of the two-wheeled motor vehicle. In addition, the axial movement of the pivot is restrained by the mounting base through the support shaft and the elastic element, whereby the prevention of the withdrawal of the pivot from the pivot bore can be achieved without provision of a special withdrawal-preventing means on the pivot to contribute to the simplification of the structure.

BEST MODE FOR CARRYING OUT THE INVENTION

Figure 1:
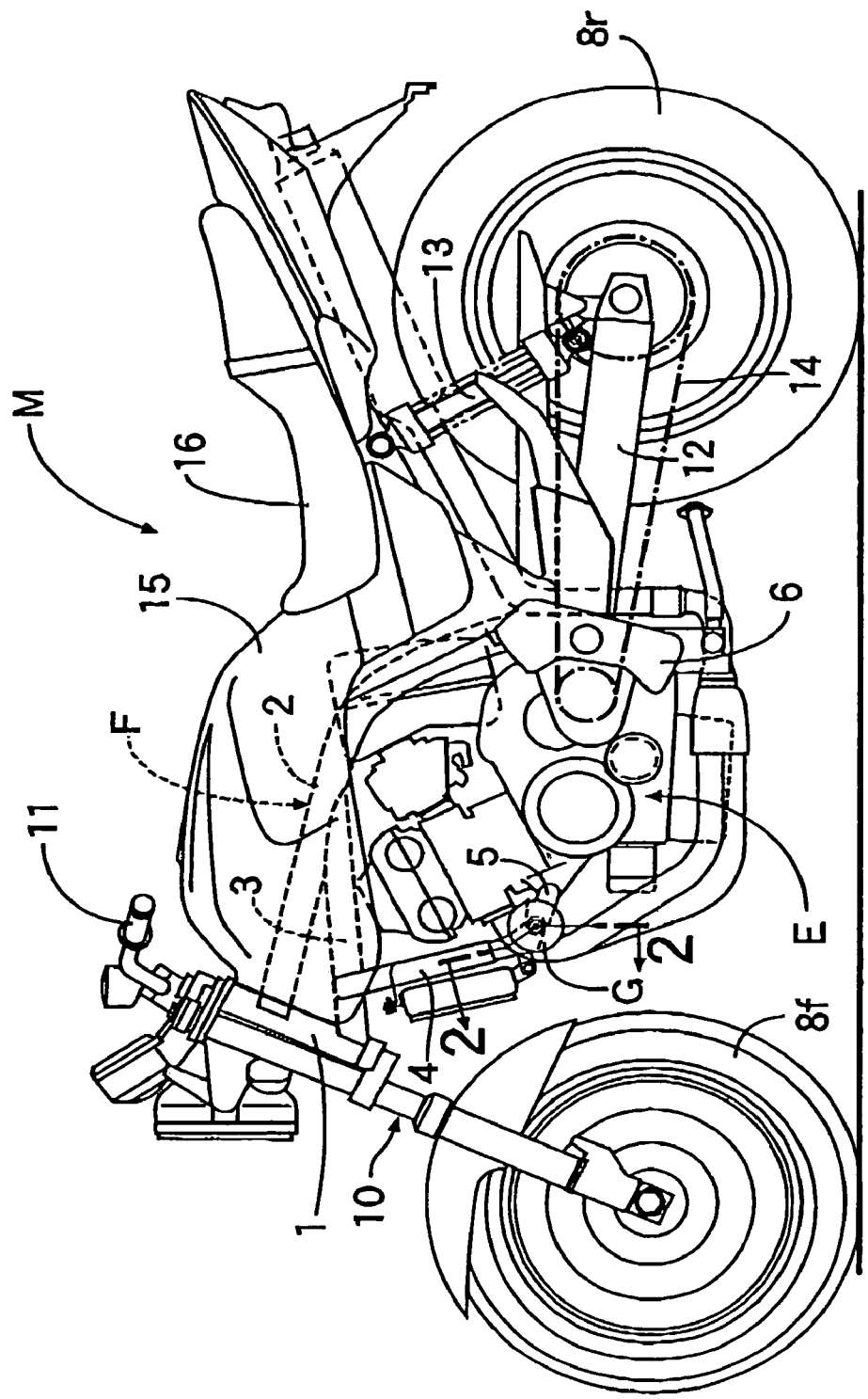
FIG. 1 is a side view of a two-wheeled motor vehicle including a vehicle body-protecting device according to the present invention.

A mode for carrying out the present invention will now be described by way of an embodiment shown in the drawings.

Referring first to FIG. 1, a vehicle body frame assembly F for a two-wheeled motor vehicle M includes a head pipe 1, a main frame 2 coupled to an upper portion of the head pipe 1 and extending rearwards with its rear half bent downwards, a stay 3 which couples a lower portion of the head pipe 1 to a lower surface of the main frame 2, and a pair of left and right down-tubes 4, 4 coupled to left and right sides of the stay 3 and extending downwards.

An engine hanger 5 is welded to a lower ends of the down-tubes 4, 4, and a pivot plate 6 is welded to a lower end of the main frame 2. Front and rear portions of an engine E are bolted to the engine hanger 5 and the pivot plate 6.

A front fork 10 for supporting a front wheel 8f is steerably supported on the head pipe 1, and a steering handlebar 11 is mounted at an upper end of the front fork.

A rear fork 12 for supporting a rear wheel 8r is pivotally coupled to the pivot plate 6 for vertically swinging movement, and a rear shock absorber 13 is interposed between the rear fork 12 and a seat rail (not shown) extending rearwards from the main frame 2. The rear wheel 8r is driven in rotation from an output shaft of the engine E through a chain 14.

A fuel tank 15 is mounted to the main frame 2 to cover the engine E from above, and a seat 16 is mounted on the seat rail and disposed to lead to a rear end of the fuel tank 15. The fuel tank 15 is of a large capacity type in which its left and right sidewalls overhang to outside the left and right outer sides of the engine E.

Figure 2:
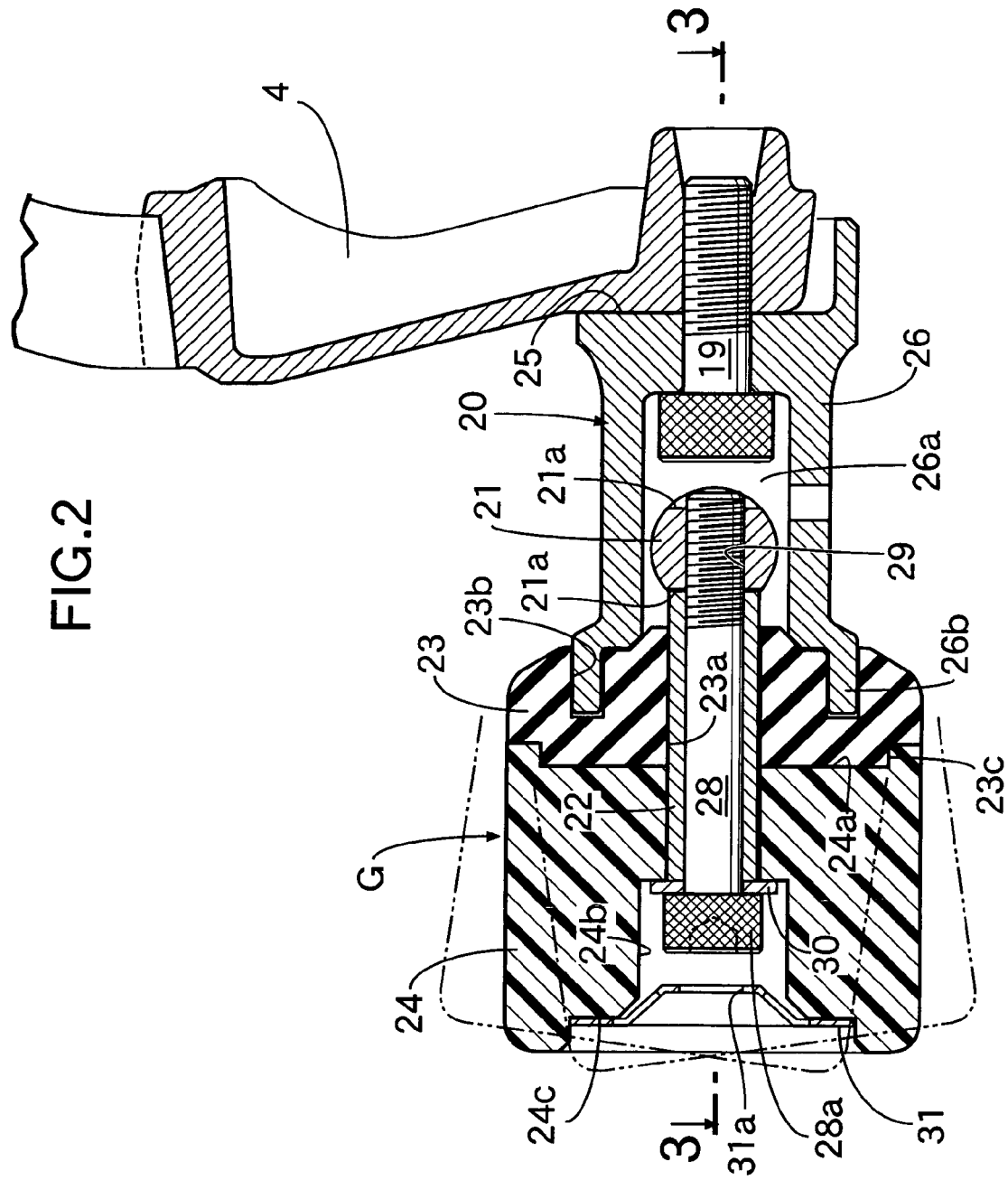
FIG. 2 is a sectional view taken alone a line 2—2 in FIG. 1 and showing the vehicle body-protecting device.
Figure 3:
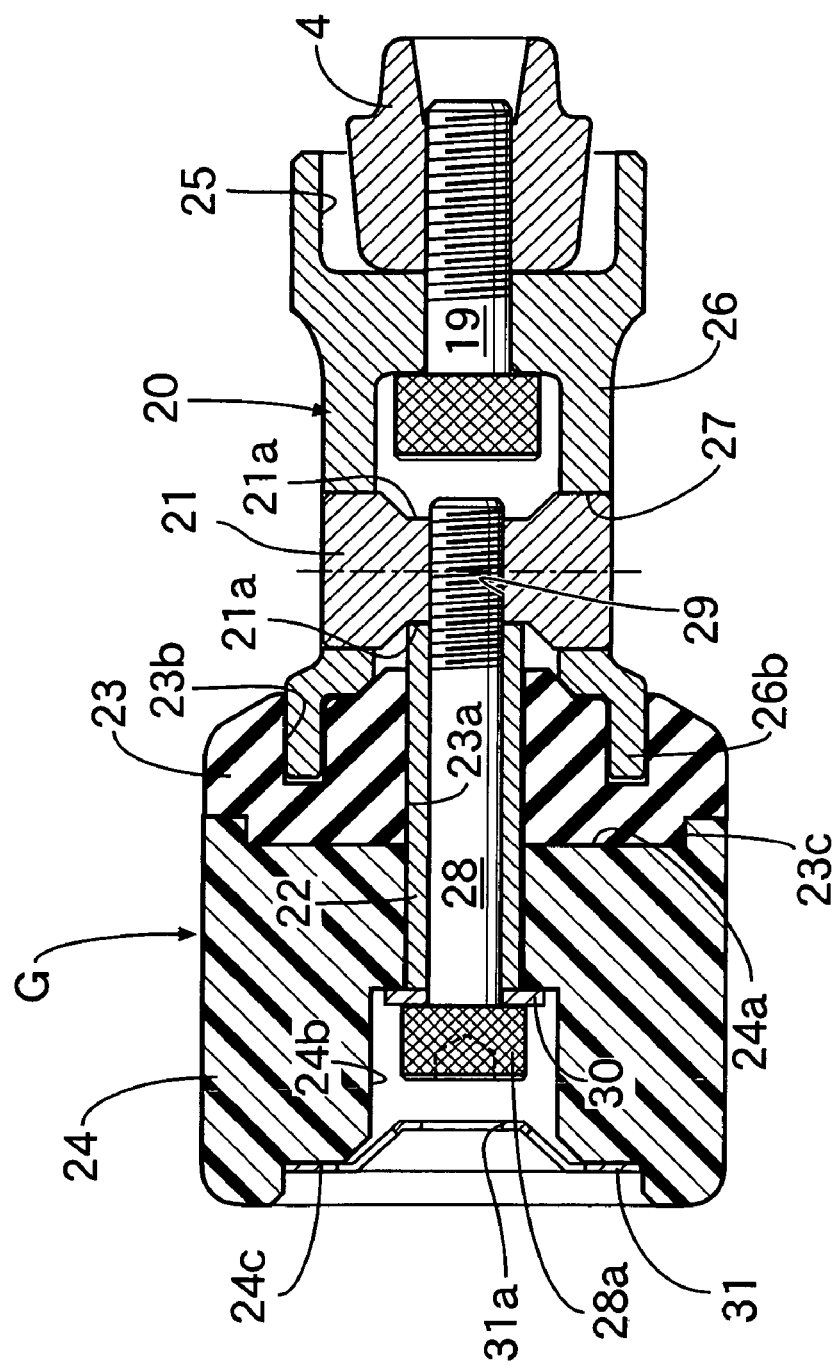
FIG. 3 is a sectional view taken along a line 3—3 in FIG. 2.

A pair of left and right guard members G, G according to the present invention are mounted at lower ends of the left and right down-tubes 4, 4, respectively. The constructions of the left and right guard members G, G are symmetric and hence, only the left guard member G will be described below with reference to FIGS. 2 and 3.

The guard member G includes, as main components, a mounting base 20 made of a light alloy, a pivot 21, a support shaft 22, an elastic element 23 made of a rubber, and a columnar ground element 24 made of a relatively hard synthetic resin (e.g., nylon). The mounting base 20 has a positioning notch 25 at one end and a bottomed hollow cylindrical portion 26 at the other end. A pivot bore 27 is made in the cylindrical portion 26 to extend across the cylindrical portion 26 on a diametrical line. The mounting base 20 is disposed so that the notch 25 is engaged with the lower end of the down-tube 4, and the cylindrical portion 26 protrudes outwards from the down-tube 4; and the bottom of the cylindrical portion 26 is secured to the down-tube 4 by a bolt 19. At this time, the position of the notch 25 of the mounting base 20 engaged with the lower end of the down-tube 4 has been determined in advance so that the pivot bore 27 is directed in a substantially longitudinal direction of the two-wheeled motor vehicle M.

The pivot 21 is rotatably fitted into the pivot bore 27. The pivot 21 has flat faces 21a, 21a parallel to each other at an intermediate portion facing a hollow 26a of the cylindrical portion 26, and the pipe-shaped support shaft 22 protruding outwards from the inside of the cylindrical portion 26 is fastened to the pivot 21 by a bolt 28 threadedly fitted into a threaded bore 29 which opens into the flat faces 21a, 21a.

The ground element 24 disposed outside the cylindrical portion 26 is axially movably and rotatably carried on the support shaft 22, and the elastic element 23 is interposed among the ground element 24, the support shaft 22 and the cylindrical portion 26. In this case, the elastic element 23 has a through-bore 23a provided at the center thereof and fitted over the outer periphery of the support shaft 22, an annular groove 23b which is provided at one end, and in which an expanded outer end 26b of the cylindrical portion 26 is received, and a flat projection 23c provided at the other end and fitted into a flat recess 24a in an inner end face of the ground element 24.

A relatively deep recess 24b is formed in an outer end face of the ground element 24, and the following components are accommodated in the recess 24b: a flat washer 30 for retaining the ground element 24 on the side of the elastic element 23, and a head 28a of the bolt 28 for fastening the flat washer 30 to the pivot 21 along with the support shaft 22.

A recess 24c having a diameter larger and a depth smaller than those of the recess 24b is also formed in the outer end face of the ground element 24, and a decorative plate 31 is press-fitted to an inner peripheral surface of the recess 24b to cover the deep recess 24b. The decorative plate 31 is provided with a through-bore 31a through which a tool fitted into a socket bore in the head 28a of the bolt 28 is permitted to be inserted. Therefore, the bolt 28 can be tightened by the tool inserted through the through-bore 31a without removal of the decorative plate 31.

The support shaft 22 is disposed substantially in parallel to an axis of the rear wheel 8r, and the ground element 24 can be swung upwards and downwards about an axis of the pivot 21 along with the support shaft 22 and can be moved axially on the support shaft 22, so that the deformation of the elastic element 23 is achieved by such swinging movement and such axial movement of the ground element 24.

Figure 4:
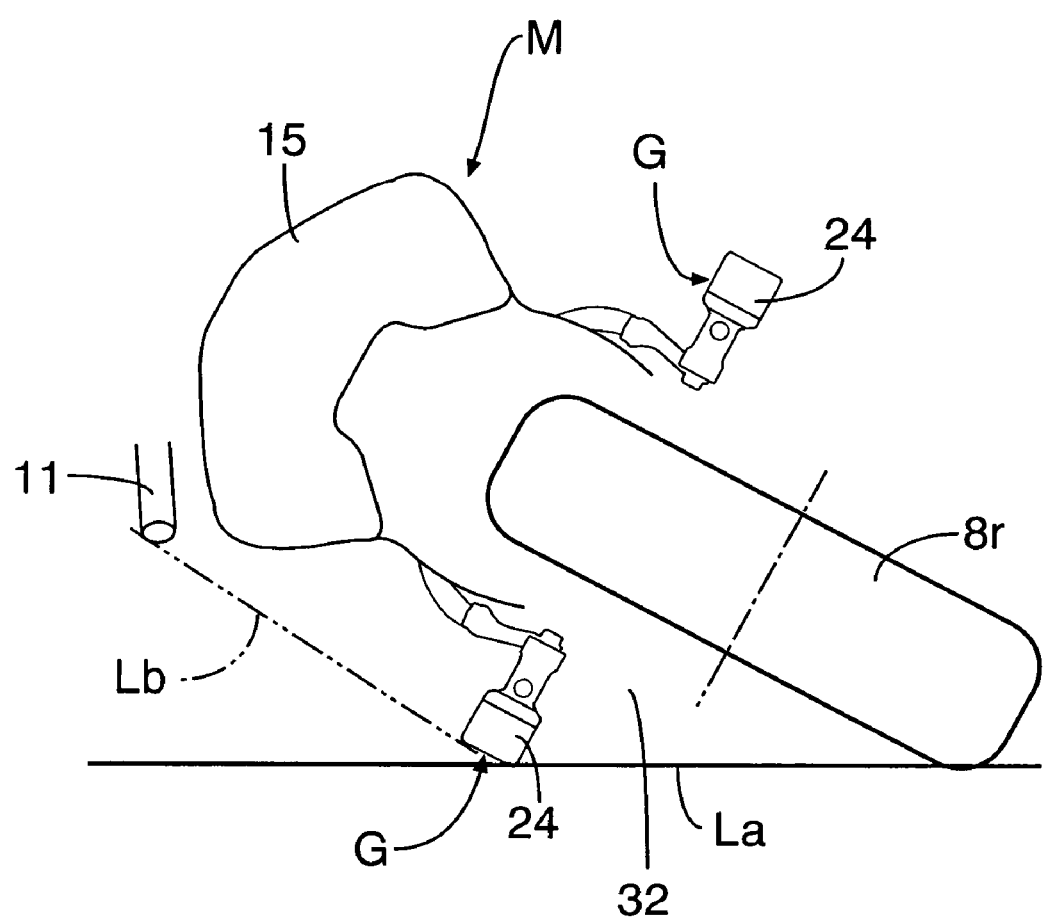
FIG. 4 is a schematic back view showing the two-wheeled motor vehicle in a turned-sideways state.

The guard member G has a length which is determined so that main parts of the two-wheeled motor or vehicle M, e.g., the engine E and the fuel tank 15 are contained in an area 32 surrounded by a first tangent line La interconnecting the ground element 24 and an outer side edge of the rear wheel 8r and a second tangent line Lb interconnecting the ground element 24 and an outer side edge of the steering handlebar 11 at a steerage limit as the two-wheeled motor vehicle M is viewed backwards, as shown in FIG. 4.

The operation of this embodiment will be described below.

When the two-wheeled motor vehicle M is turned sideways, the ground element 24 of the ward member G first collides with a road surface coming onto the first tangent line La, as shown in FIG. 4. Then, the two-wheeled motor vehicle M is inclined, so that the rear wheel is floated about the ground element 24, in some cases, and a tip end of the steering handlebar 11 at the steerage limit strikes against a road surface coming onto the second tangent line Lb. In either case, the contact of the main components of the two-wheeled motor vehicle M such as the engine E and the fuel tank 15 with the road surface can be prevented, because the main components are contained in the area 32 surrounding by the first and second tangent lines La and Lb.

Figure 5:
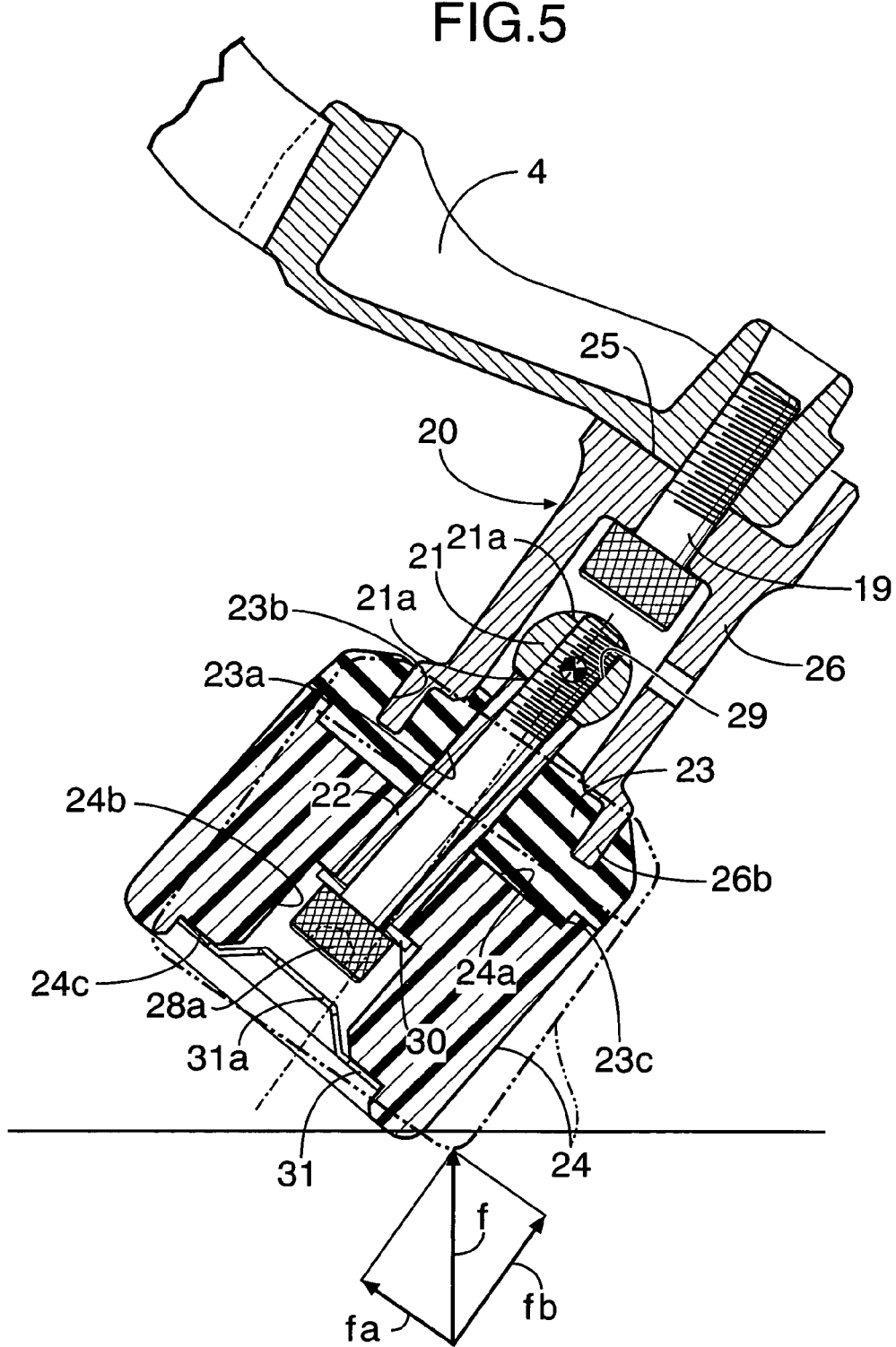
FIG. 5 is a view for explaining the operation of the vehicle body-protecting device.

When the two-wheeled motor vehicle M is turned sideways, a shock force f (see FIG. 5) applied from the road surface to the ground element 24 acts obliquely with respect to the axis of the ground element 24. Therefore, the ground element 24 is swung about the axis of the pivot 21 along with the support shaft 22 by a component fa of the shock force f perpendicular to the support shaft 22, and the ground element 24 is moved on the support shaft 22 toward the mounting base 20 by a component fb of the shock force f parallel to the support shaft 22. The elastic element 23 is deformed between the ground element 24 and the mounting base 20 by any of these movements of the ground element 24 and hence, the shock force f can be buffered effectively. Therefore, it is avoided that an excessive shock force is applied to the vehicle body frame assembly F supporting the guard member G and thus, it is unnecessary to specially strengthen the vehicle body frame assembly F, and it is possible to provide a reduction in weight of the vehicle body frame assembly F.

In the guard member G, the support shaft 22 is secured to the pivot 21 fitted in the pivot bore 27 in the mounting base 20 by the bolt 28, and the elastic element 23 fitted over the outer periphery of the support shaft 22 is fitted to the cylindrical portion 26 of the mounting base 20. Therefore, the axial movement of the pivot 21 is restrained by the mounting base 20 through the support shaft 22 and the elastic element 23 and hence, it is possible to prevent the withdrawal of the pivot 21 from the pivot bore 27 without provision of a special withdrawal-preventing means on the pivot 21, thereby bringing about the simplification of the structure.

The ground element 24 and the elastic element 23 damaged by the turning-sideways of the two-wheeled motor vehicle M can be replaced easily by new parts by detaching the bolt 28.

The present invention is not limited to the above-described embodiment, and various modifications in design may be made without departing from the subject matter of the invention.

What is claimed is:

1. A vehicle body-protecting device for a two-wheeled motor vehicle, in which a pair of left and right guard members are mounted to a vehicle body frame assembly to overhang laterally outwards, so that when the two wheeled motor vehicle is turned sideways, said guard members are allowed to be grounded, whereby the grounding of an outer surface of a vehicle body is diminished,
    wherein each of the guard members is formed by connecting a ground element which is grounded upon the turning-sideways of the two-wheeled motor vehicle to amounting base secured to the vehicle body frame assembly through a deformable elastic element which permits swinging movement of the ground element relative to the mounting base, and which deforms to buffer a shock force from the around element to the mounting base.

2. A vehicle body-protecting device for a two-wheeled motor vehicle according to claim 1,
    wherein said ground element is connected to said mounting base for movement along an axis substantially parallel to an axis of a rear wheel of the two-wheeled motor vehicle, so that said elastic element is deformed even when said ground element is moved toward the mounting base.

3. A vehicle-body protecting device for a two-wheeled motor vehicle according to claim 1, wherein the ground element is formed of a hard synthetic resin.

4. A vehicle body-protecting device for a two-wheeled motor vehicle according to claim 1, wherein the elastic element is formed of rubber.

5. A vehicle-body protecting device for a two-wheeled motor vehicle according to claim 1, wherein the ground clement is positioned outside of the mounting base and the deformable elastic element in a lateral direction of the vehicle body frame.

6. A vehicle-body protecting device for a two-wheeled motor vehicle according to claim 1, wherein the deformable elastic element is configured to deform in a lateral direction of the vehicle body frame and in a direction inclined relative to the lateral direction of the vehicle body frame so as to buffer a shock force from the ground element when the two wheeled motor vehicle is turned sideways.

7. A vehicle-body protecting device for a two-wheeled motor vehicle according to claim 1, wherein a device for restricting movement of the ground element is provided on the mounting base, the device configured to:
    restrict a movement of the ground element in a laterally outward direction of the vehicle body frame;
    permit movement of the ground element in a laterally inward direction of the vehicle body frame; and
    permit swinging movement of the ground element.

8. A vehicle-body protecting device for a two-wheeled motor vehicle,
    in which a pair of left and right guard members are mounted to a vehicle body frame assembly to overhang laterally outwards, so that when the two wheeled motor vehicle is turned sideways, said guard members are allowed to be grounded, whereby the grounding of an outer surface of a vehicle body is diminished,
    wherein each of said guard members is formed by connecting a ground element which is grounded upon the turning-sideways of the two-wheeled motor vehicle to a mounting base secured to the vehicle body frame assembly through an elastic element for swinging movement,
    wherein said ground element is connected to said mounting base for movement along an axis substantially parallel to an axis of a rear wheel of the two-wheeled motor vehicle, so that said elastic element is deformed even when said ground element is moved toward the mounting base, and
    wherein a pivot including a support shaft substantially parallel to an axis of the rear wheel of the two-wheeled motor vehicle is fitted into a pivot bore which is provided in said mounting base and which extends in a longitudinal direction of the two-wheeled motor vehicle; said ground element is axially movably mounted to said support shaft; and said elastic element is interposed among said mounting base, said ground element, and said support shaft.

* * * * *